(12) United States Patent
Shen et al.

(10) Patent No.: US 8,162,525 B2
(45) Date of Patent: Apr. 24, 2012

(54) LIGHT GUIDE PLATE AND DISPLAY APPARATUS

(75) Inventors: Liang Shen, Suzhou (CN); Guan-chen Zhu, Suzhou (CN); Dong-mei Pan, Suzhou (CN)

(73) Assignees: AU Optronics (Suzhou) Corp, Suzhou Industrial Park (CN); AU Optronics Corp, Hsin-Chu (TW)

( * ) Notice: Subject to any disclaimer, the term of this patent is extended or adjusted under 35 U.S.C. 154(b) by 294 days.

(21) Appl. No.: 12/560,945

(22) Filed: Sep. 16, 2009

(65) Prior Publication Data

US 2010/0118563 A1 May 13, 2010

(30) Foreign Application Priority Data

Nov. 12, 2008 (CN) .......................... 2008 1 0202683

(51) Int. Cl.
*F21V 7/04* (2006.01)
*F21V 8/00* (2006.01)
(52) U.S. Cl. .................. 362/609; 362/621; 362/628
(58) Field of Classification Search .......... 362/608–610, 362/621, 622, 628, 623
See application file for complete search history.

(56) References Cited

U.S. PATENT DOCUMENTS

| | | | | |
|---|---|---|---|---|
| 5,673,128 A * | 9/1997 | Ohta et al. | | 349/62 |
| 5,808,708 A * | 9/1998 | Oyama et al. | | 349/65 |
| 6,273,577 B1 | 8/2001 | Goto et al. | | |
| 7,056,001 B2 * | 6/2006 | Chuang | | 362/609 |
| 7,263,268 B2 | 8/2007 | Inditsky | | |
| 7,740,389 B2 * | 6/2010 | Chen et al. | | 362/609 |
| 7,942,565 B2 * | 5/2011 | Klick et al. | | 362/610 |
| 2004/0109306 A1 | 6/2004 | Lee | | |
| 2004/0151007 A1 | 8/2004 | Chuang | | |
| 2005/0259441 A1 | 11/2005 | Arai et al. | | |
| 2006/0072339 A1 * | 4/2006 | Li et al. | | 362/608 |
| 2010/0296268 A1 * | 11/2010 | Fasham et al. | | 362/97.1 |

FOREIGN PATENT DOCUMENTS

| | | | |
|---|---|---|---|
| CN | 1504975 A | | 6/2004 |
| JP | 11329042 A | | 11/1999 |
| JP | 2003031016 A | * | 1/2003 |
| JP | 2003255345 A | | 9/2003 |
| JP | 2006221922 A | | 8/2006 |

OTHER PUBLICATIONS

English translation of JP2003-031016, Fujishiro et al., translated Oct. 3, 2011, pp. 1-9.*

* cited by examiner

*Primary Examiner* — Alan Cariaso (57) ABSTRACT

A light guide plate and a display apparatus are disclosed. The light guide plate comprises a first portion and a second portion. The first portion includes a light output surface. The second portion is formed on one end of the first portion to guide light into the first portion, wherein the second portion includes a light input surface adjacent to at least one light source, a first reflection surface and a second reflection surface adjacent to the first reflection surface, and the light input surface and the light output surface are substantially in the form of an L-shape. The light guide plate is applicable to the display apparatus.

21 Claims, 7 Drawing Sheets

LIGHT GUIDE PLATE AND DISPLAY APPARATUS

CLAIM OF PRIORITY

This application claims priority to Chinese Patent Application No. 200810202683.3 filed on Nov. 11, 2008.

FIELD OF THE INVENTION

The present invention relates to light guide plate and a display apparatus, and more particularly, to a light guide plate and a display apparatus which can reduce the total thickness of the display apparatus.

BACKGROUND OF THE INVENTION

Liquid crystal displays (LCDs) have been widely applied in electrical products due to the rapid progress of optical and semiconductor technologies. With their advantages of high image quality, compact size, light weight, low driving voltage, low power consumption and various applications, LCDs have been introduced into portable computers, mobile phones, personal digital assistants, and color televisions are becoming the mainstream display apparatus.

Currently, LCDs mostly comprise a liquid crystal panel and a backlight module disposed behind the panel. Therefore, the backlight module is one of the key components of an LCD. According to the position of the backlight source, the backlight module can be an edge-lighting type or a bottom-lighting type in order to provide LCDs with backlight.

Conventional edge-lighting backlight module uses a light guide plate to guide light through an optical filter for optical improvement, thereby forming a uniform planar light. A light source is disposed at one side of the light guide plate for lighting, and the liquid crystal panel is disposed on the light source and the light guide plate.

Currently, LCDs are thinner and lighter, so the backlight module has to reduce thickness and weight, correspondingly. However, the light source is of a fixed thickness. Therefore, it is difficult to reduce the thickness of the edge-lighting backlight module under the fixed thickness of the light source, thus making LCDs difficult to reduce thickness as a result. Furthermore, the light intensity of the backlight module is susceptible to be higher near the light source, and thus the brightness thereof is not uniform.

SUMMARY OF THE INVENTION

Therefore, an aspect of the present invention is to provide a light guide plate and a display apparatus, thereby reducing the total thickness of the display apparatus which is not limited to the thickness limitation of a light source.

Another aspect of the present invention is to provide a light guide plate and a display apparatus, thereby uniforming light and improving the uniformity of the backlight module.

According to an embodiment of the present invention, the light guide plate comprises a first portion and at least one second portion. The first portion includes a light output surface. The second portion is formed on one end of the first portion, wherein the second portion includes a light input surface adjacent to at least one light source, a first reflection surface and a second reflection surface adjacent to the first reflection surface, and the first reflection surface is configured to reflect the light inputted from the light input surface to the second reflection surface, and the second reflection surface is configured to reflect the light reflected from the first reflection surface to the first portion, and the light input surface and the light output surface are substantially in the form of an L-shape.

According to another embodiment of the present invention, the display apparatus comprises a light guide plate, a display panel and at least one light source. The light guide plate comprises a first portion and at least one second portion. The first portion includes a light output surface. The second portion is formed on one end of the first portion, wherein the second portion includes a light input surface, a first reflection surface and a second reflection surface adjacent to the first reflection surface, and the first reflection surface is configured to reflect the light inputted from the light input surface to the second reflection surface, and the second reflection surface is configured to reflect the light reflected from the first reflection surface to the first portion, and the light input surface and the light output surface are substantially in the form of an L-shape. The display panel is disposed on the light output surface of the first portion of the light guide plate, wherein there is a distance between the display panel and the second portion to form a receiving space. The light source is disposed in the receiving space and adjacent to the light input surface of the second portion.

Therefore, with the use of the light guide plate and the display apparatus disclosed in the embodiments of the present invention, the total thickness of the display apparatus can be reduced, and the light uniformity thereof can be improved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In order to make the illustration of the present invention more explicit and complete, the following description is stated with reference to FIG. 1 through FIG. 6B.

Figure 1:
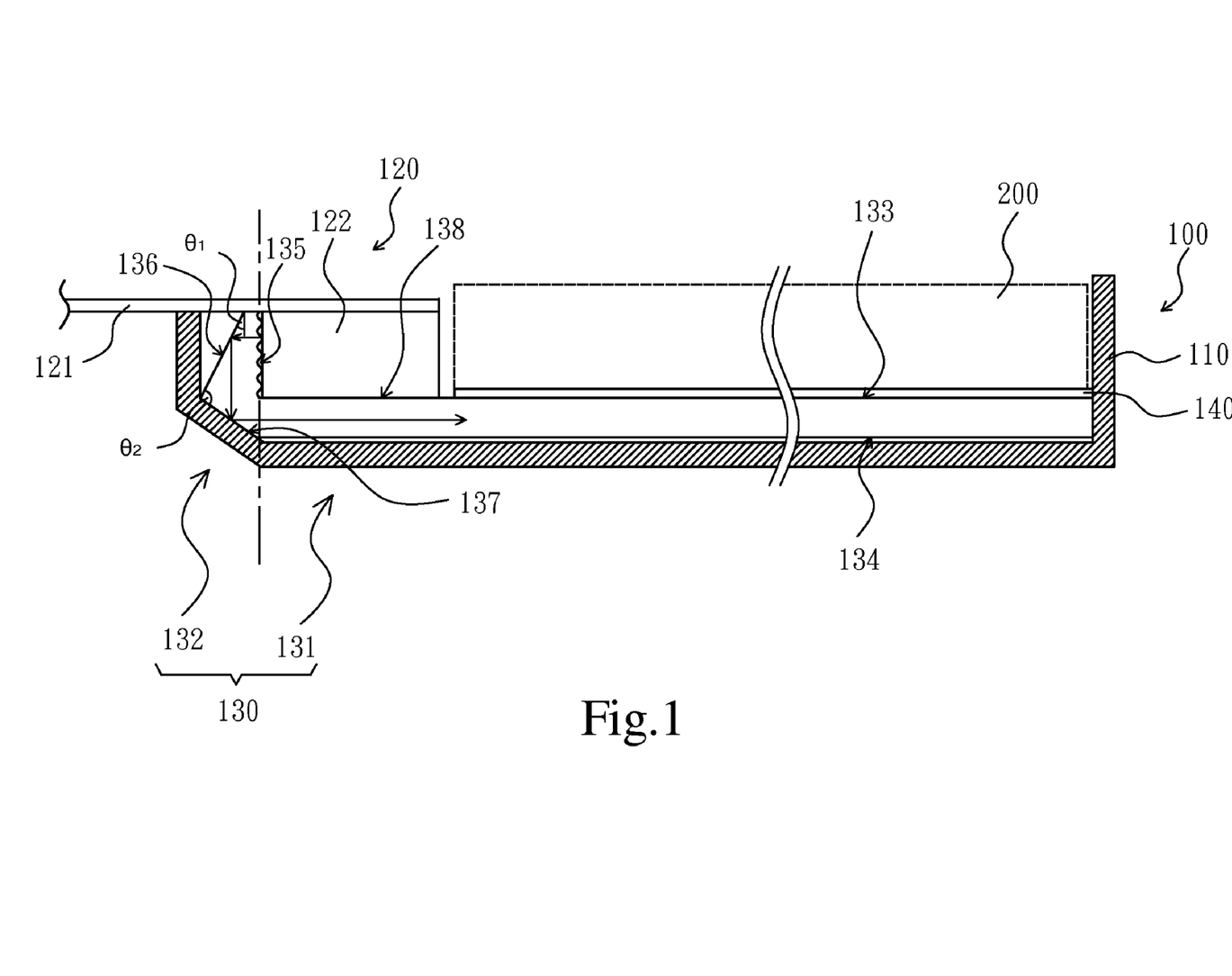
FIG. 1 is a cross-section view showing a liquid crystal display panel and a backlight module according to a first embodiment of the present invention.

Referring to FIG. 1, a cross-section view showing a liquid crystal display panel and a backlight module according to a first embodiment of the present invention is presented herein. The backlight module 100 of the present embodiment is disposed opposite to a liquid crystal display panel 200, thereby forming an LCD apparatus. The backlight module 100 comprises a casing 110, at least one light source 120, a light guide plate 130 and at least one optical film 140. The light source 120, the light guide plate 130 and the optical film 140 are disposed in the casing 110. The light source 120 is disposed on one side of the light guide plate 130 to emit light into the light guide plate 130, and the light guide plate 130 guides light to output. The optical film 140 is disposed above the light guide plate 130 for optical improvement.

Referring to FIG. 1 again. The casing 110 of the present embodiment may be made of an opaque material, such as plastic, metal or any combination material thereof. The light source 120 of the present embodiment may be a cold cathode fluorescent lamp (CCFL), a hot cathode fluorescent lamp (HCFL), a light emitting diode (LED), an organic light emitting diode (OLED), an electro-luminescence (EL) device, a light bar or any combination thereof. In the present embodiment, the light source 120 may be a light bar which has a circuit board 121 and at least one lighting device 122. The circuit board 121 may be a printed circuit board (PCB) or a flexible printed circuit (FPC) board, and the lighting device 122 is disposed on the circuit board 121.

Referring to FIG. 1 again. The light guide plate 130 of the present embodiment may be made by the method of injection molding, and the material of the light guide plate 130 may be photo-curable resin, polymethylmethacrylate (PMMA) or polycarbonate (PC). The light guide plate 130 comprises a first portion 131 and at least one second portion 132. The first portion 131 is disposed corresponding to the liquid crystal display panel 200 for outputting light thereto.

The first portion 131 of the light guide plate 130 includes a light output surface 133 and a light reflection surface 134. The light output surface 133 is formed on one side of the first portion 131 and faces to the liquid crystal display panel 200. The light output surface 133 may include a cloudy surface or a plurality of scattering patterns to uniform light outputted from the light guide plate 130, i.e. the situation of mura is prevented. In one embodiment, the light output surface 133 may include a plurality of protruding structures (not shown) to modify the direction of light, thereby condensing light and enhancing the brightness thereof, wherein the protruding structures may be prism-shaped structures or semicircle-shaped structures. The light reflection surface 134 is formed opposite to the light output surface 133 for reflecting light thereto. In the present embodiment, the first portion 131 is a flat plate structure. At this time, the light reflection surface 134 may have a plurality of light guiding structures (not shown) formed thereon to guide the light emitted from the light source 120 to the light output surface 133. The light guiding structures of the light reflection surface 134 may be a plurality of V-cut structures formed by a method such as injection molding or micro-cutting process, a cloudy surface formed by a method such as sanding process, or a plurality of scattering patterns formed by a method such as printing, thereby guiding light to be outputted from the light output surface 133.

Figure 2:
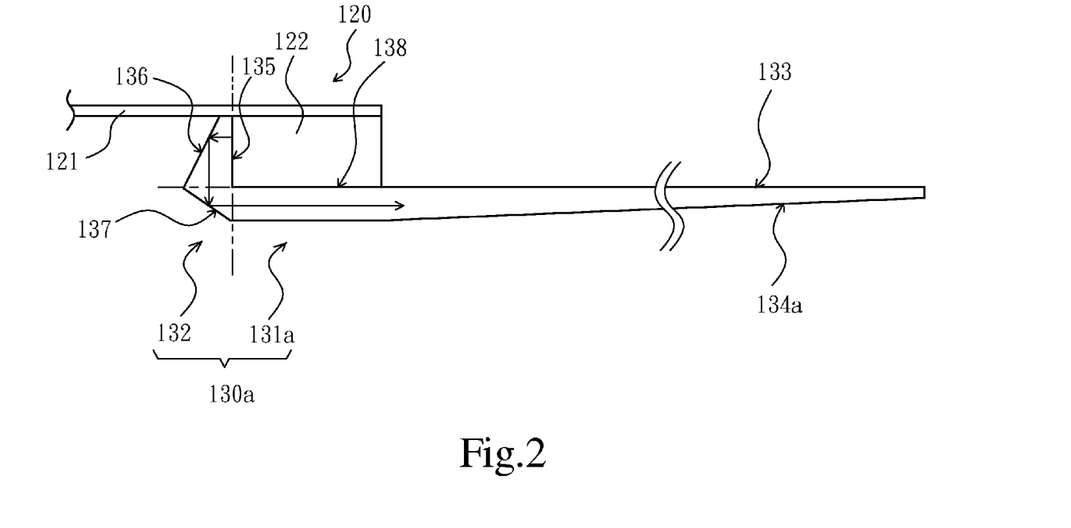
FIG. 2 is a cross-section view showing a light guide plate according to one embodiment of the present invention.

Referring to FIG. 2, a cross-section view showing a light guide plate according to one embodiment of the present invention is presented herein. In one embodiment, the first portion 131a may have a wedge-shaped plate structure, wherein the thickness thereof closes to the second portion 132 is thicker than the thickness thereof away from the light source 120. At this time, the light reflection surface 134a of the first portion 131a may not have the light guiding structures, but use the inclined plane (the light reflection surface 134a) of the first portion 131a to reflect the light to be outputted from the light output surface 133.

Referring to FIG. 1 again. The second portion 132 of the light guide plate 130 is formed on one end of the first portion 131 for guiding the light emitted from the light source 120 thereto. The second portion 132 includes a light input surface 135 adjacent to the light source 120, a first reflection surface 136 and a second reflection surface 137 adjacent to the first reflection surface 136, wherein the light input surface 135 of the second portion 132 and the light output surface 133 of the first portion 131 are substantially in the form of an L-shape. A portion of the second portion 132 protrudes upwards from the first portion 131 to form the light input surface 135 and the first reflection surface 136. The light input surface 135 is configured to allow the light emitted from the light source 120 to be inputted in the second portion 132. In the present embodiment, the light input surface 135 is vertical to the light output surface 133 of the first portion 131, for example. The light input surface 135 may include V-cut structures, S-shaped structures or a rough surface structure to enhance light incidence efficiency and light coupling efficiency. The first reflection surface 136 is formed corresponding to the light input surface 135 for reflecting the light inputted from the light input surface 135 to the second reflection surface 137. In the present embodiment, the first reflection surface 136 may be an inclined plane surface for reflecting light to the second reflection surface 137, and there is an angle $\theta 1$ which is less than 90 degrees and formed between the light input surface 135 and the first reflection surface 136. Preferably, the vertical height of the first reflection surface 136 is equal to or greater than the vertical height of the light input surface 135, thereby allowing the total light inputted from the light input surface 135 to be emitted thereto. The second reflection surface 137 is formed corresponding to the first reflection surface 136 for reflecting the light inputted from the first reflection surface 136 to the first portion 131. In the present embodiment, the second reflection surface 137 may be an inclined plane surface for reflecting light to the first portion 131, and there is an angle $\theta 2$ which is less than 180 degrees, and preferably greater than 90 degrees and formed between the second reflection surface 137 and the first reflection surface 136. However, the angles $\theta 1$ and $\theta 2$ can be determined according to the relationship between the light input surface 135, the first reflection surface 136, and the second reflection surface 137, but not limited to the above description so as to reflect light twice for reflecting the light emitted from the light source 120 to the first portion 131. The display panel 200 is disposed on the light output surface 133 of the first portion 131 of the light guide plate 130, wherein there is a distance between the display panel 200 and the second portion 132 to form a receiving space. The light source 120 is disposed in the receiving space and adjacent to the light input surface 135 of the second portion 132. A light source disposing surface 138 of the first portion 131 is formed in the receiving space between the display panel 200 and the second portion 132 configured to dispose the light source 120, wherein the light source disposing surface 138 and the light output surface 133 are located at the same side of the light guide plate 130. Therefore, when the liquid crystal display panel 200 is disposed on the light output surface 133 of the first portion 131, the light source 120 and the liquid crystal display panel 200 can be located at the same side of the light guide plate 130, thereby reducing the total thickness of the backlight module 100 and the liquid crystal display panel 200. In the present embodiment, the light source disposing surface 138 and the light output surface 133 are located at the same plane surface.

It is worth mentioning that a light reflective material can be formed (such as coated or attached) on the light reflection surface 134, the first reflection surface 136, the second reflection surface 137, and the light source disposing surface 138 of the light guide plate 130 except the light output surface 133 and the light input surface 135 so as to reflect light. The light reflective materials may be Au, Ag, Al, Au, Cr, Cu, In, Ir, Ni, Pt, Re, Rh, Sn, Ta, W, Mn, white paint with etiolation-resistant and heat-resistant properties or any combination thereof. In one embodiment, a reflective sheet or layer can be bonded on the other surfaces of the light guide plate 130 except the light output surface 133 and the light input surface 135.

Referring to FIG. 1 again. The optical film 140 of the present embodiment may be a diffuser, a prism sheet, a turning prism sheet, a brightness enhancement film, a dual brightness enhancement film, a diffused reflective polarizer film or any combination thereof and is disposed above the first portion 131 of the light guide plate 130 for optical improvement.

Referring to FIG. 1 again. When assembling the backlight module 100 and the liquid crystal display panel 200, first, the light source 120 is disposed in the receiving space (on the light source disposing surface 138) and adjacent to the light input surface 135 of the second portion 132, thereby forming the backlight module 100, and then the liquid crystal display panel 200 is disposed on the light output surface 133 of the first portion 131 of the light guide plate 130, wherein the light source 120 and the liquid crystal display panel 200 can be located at the same side of the light guide plate 130, thereby forming the LCD apparatus.

Referring to FIG. 1 again. When the backlight module 100 provides backlight to the liquid crystal display panel 200, the light of the light source 120 is inputted from the light input surface 135 of the second portion 132, and then the first reflection surface 136 reflects light to the second reflection surface 137, and then the second reflection surface 137 reflects light to the first portion 131 so as to output light to the liquid crystal display panel 200. The light of the light source 120 is guided to the first portion 131 by twice reflection, thereby enhancing light uniform effect and greatly preventing the brightness of the backlight module 100 from being not uniform.

Therefore, the light guide plate 130 of the present embodiment, the backlight module and the LCD apparatus including the same can reduce the total thickness of the LCD apparatus but not limited to the thickness limitation of the light source 120. Furthermore, the light guide plate 130 can uniform the light emitted from the light source 120, thereby improving the uniformity of the backlight module 100.

Figure 3:
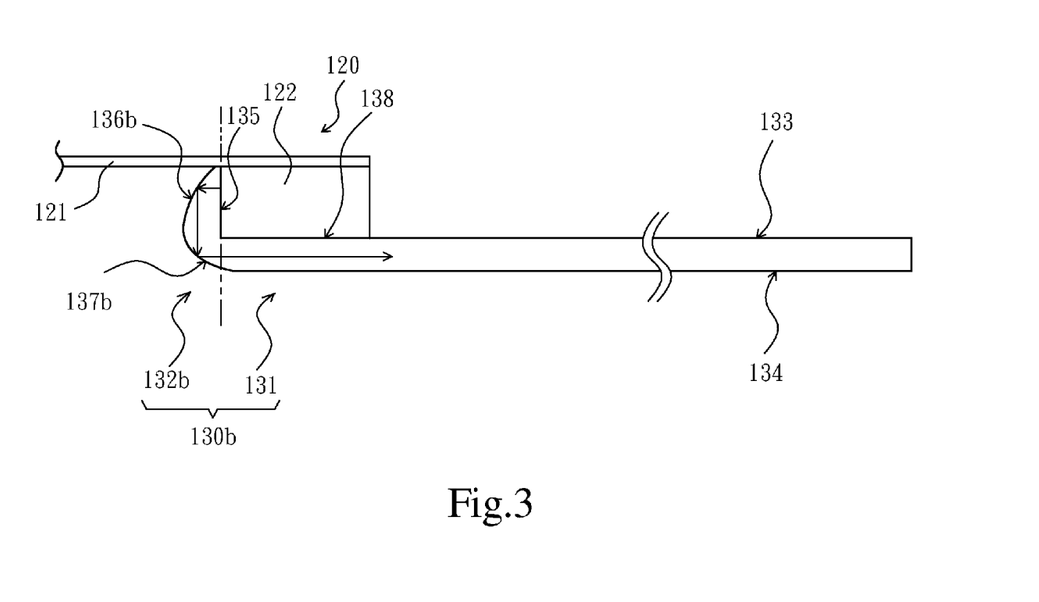
FIG. 3 is a cross-section view showing a backlight module according to a second embodiment of the present invention.

Referring to FIG. 3, a cross-section view showing a backlight module according to a second embodiment of the present invention is presented herein. Some reference numerals shown in the first embodiment are used in the second embodiment of the present invention. The construction of the second embodiment is similar to that in the first embodiment with respect to configuration and function, and thus is not stated in detail herein.

Referring again to FIG. 3, in comparison with the first embodiment, the first reflection surface 136b or the second reflection surface 137b of the second portion 132b of the light guide plate 130b of the second embodiment may be a curved surface to reflect light twice to the first portion 131.

Figure 4:
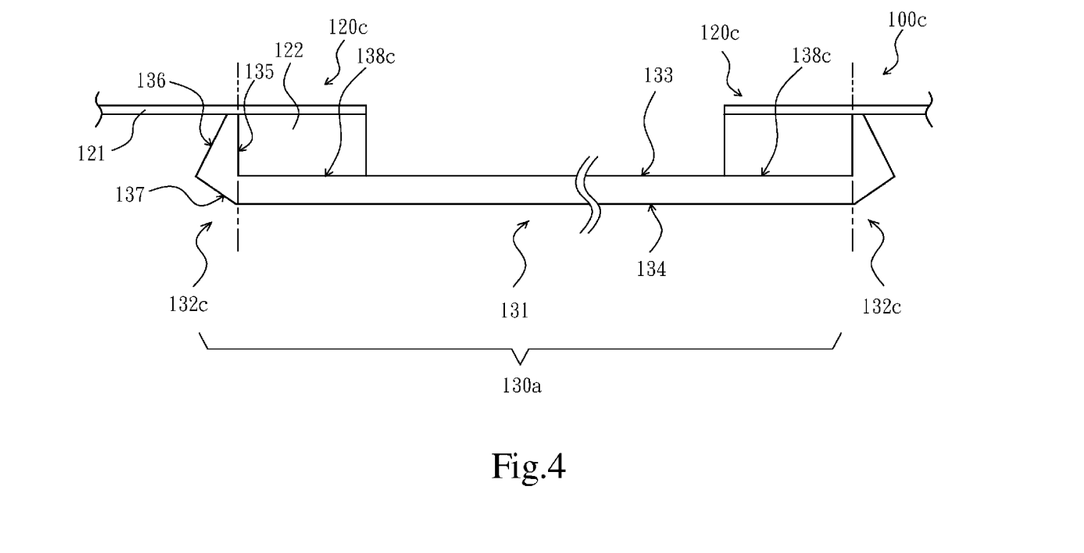
FIG. 4 is a cross-section view showing a backlight module according to a third embodiment of the present invention.

Referring to FIG. 4, a cross-section view showing a backlight module according to a third embodiment of the present invention is presented herein. Some reference numerals shown in the first embodiment are used in the third embodiment of the present invention. The construction of the third embodiment is similar to that in the first embodiment with respect to configuration and function, and thus is not stated in detail herein.

Referring again to FIG. 4, in comparison with the first embodiment, the backlight module 100c of the third embodiment comprises two light sources 120c. At this time, the light guide plate 130c may comprise two second portions 132c respectively disposed at both ends of the first portion 131, and the light sources 120c are respectively disposed at two light source disposing surfaces 138c. The second portions 132c can respectively guide light to be inputted in the first portion 131, thereby increasing the backlight brightness of the backlight module 100c and being suitable for a large size LCD apparatus.

Figure 5:
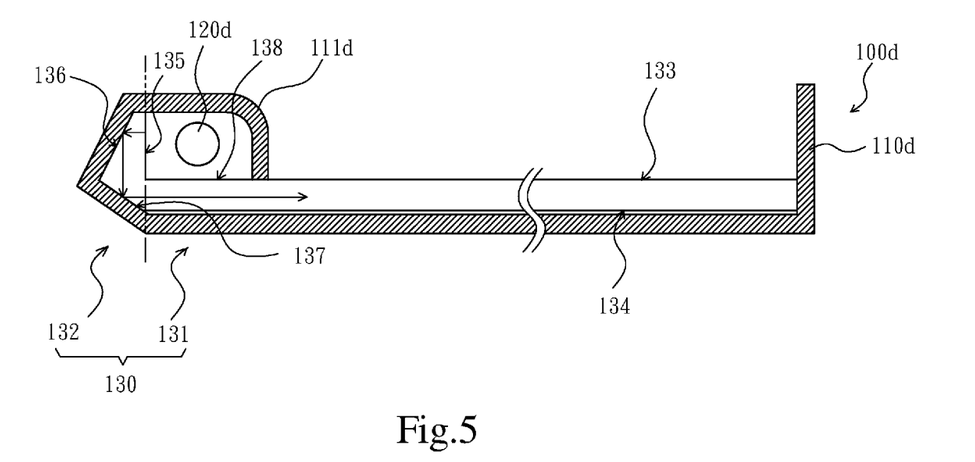
FIG. 5 is a cross-section view showing a backlight module according to a fourth embodiment of the present invention.

Referring to FIG. 5, a cross-section view showing a backlight module according to a fourth embodiment of the present invention is presented herein. Some reference numerals shown in the first embodiment are used in the fourth embodiment of the present invention. The construction of the fourth embodiment is similar to that in the first embodiment with respect to configuration and function, and thus is not stated in detail herein.

Referring again to FIG. 5, in comparison with the first embodiment, the light source 120d of the backlight module 100d of the fourth embodiment may be lamps, such as CCFL or HCFL. At this time, the casing 110d may include a lamp cover 111d on the light source disposing surface 138 forming the receiving space to receive the light source 120d and to prevent light from leaking out. Furthermore, the above-mentioned light reflective material can be formed on the sidewall of the casing 110d.

Figure 6A:
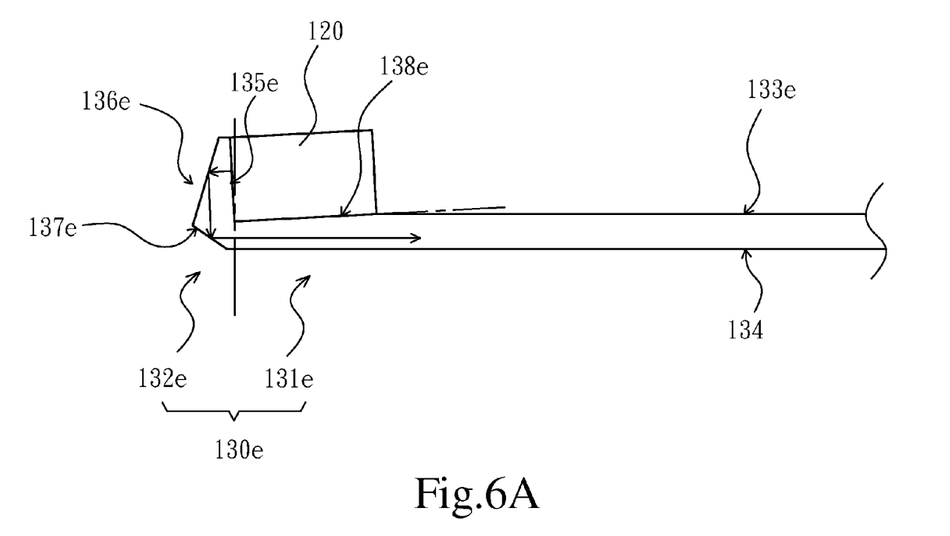
FIG. 6A and FIG. 6B are partial cross-section views showing a backlight module according to a fifth embodiment of the present invention.
Figure 6B:
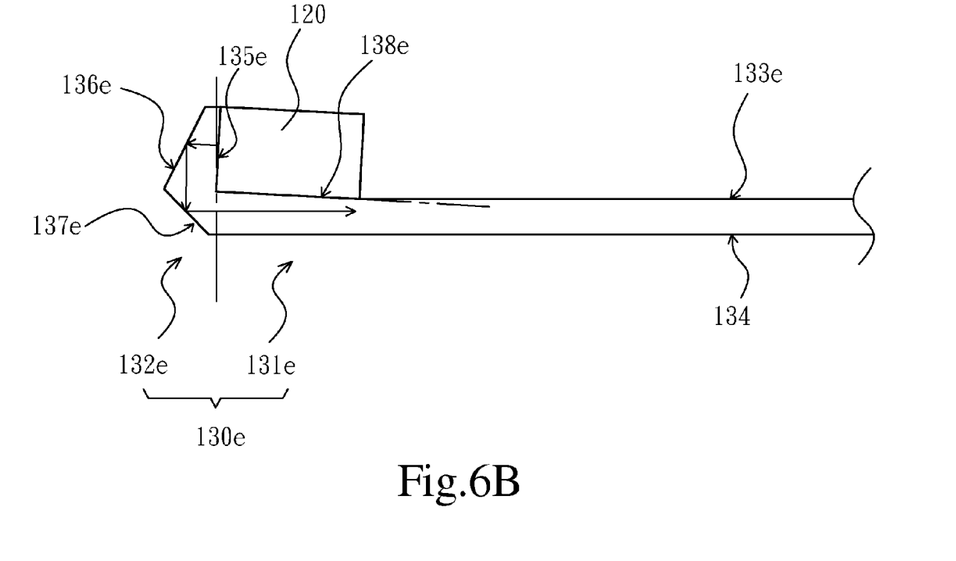

Referring to FIG. 6A and FIG. 6B, partial cross-section views showing a backlight module according to a fifth embodiment of the present invention are presented herein. Some reference numerals shown in the first embodiment are used in the fifth embodiment of the present invention. The construction of the fifth embodiment is similar to that in the first embodiment with respect to configuration and function, and thus is not stated in detail herein.

Referring again to FIG. 6A and FIG. 6B, in comparison with the first embodiment, the light input surface 135e of the second portion 132e is not vertical to the light output surface 133e of the first portion 131, and the light source disposing surface 138e and the light output surface 133e may be selectively not located at the same plane surface. At this time, the disposing angle of the first reflection surface 136e and the second reflection surface 137e can be determined according to the light input surface 135e so as to reflect light twice for reflecting the light emitted from the light source 120 to the first portion 131e.

Therefore, the light guide plate 130 of the present invention, the backlight module and the display apparatus including the same can reduce the total thickness of the display apparatus. Furthermore, the light guide plate can uniform the light emitted from the light source, thereby improving the uniformity of the backlight module.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A light guide plate comprising:
    a first portion including a light output surface and a light source disposing surface; and
    at least one second portion formed on one end of the first portion, wherein the second portion includes a light input surface adjacent to at least one light source, a first reflection surface and a second reflection surface adjacent to the first reflection surface, and the first reflection surface is configured to reflect the light inputted from the light input surface to the second reflection surface, and the second reflection surface is configured to reflect the light reflected from the first reflection surface to the first portion, and the light input surface and the light output surface are substantially in the form of an L-shape, and the light source is disposed on an L-shaped area between the light input surface and the light output surface, and the light source contacts with the light source disposing surface, and the light source disposing surface and the light output surface are located at the same side of the light guide plate.

2. The light guide plate as claimed in claim 1, wherein a portion of the second portion protrudes upwards from the first portion.

3. The light guide plate as claimed in claim 1, wherein the vertical height of the first reflection surface is equal to or greater than the vertical height of the light input surface.

4. The light guide plate as claimed in claim 1, wherein the first reflection surface or the second reflection surface is a plane surface.

5. The light guide plate as claimed in claim 1, wherein the first reflection surface or the second reflection surface is a curved surface.

6. The light guide plate as claimed in claim 1, wherein the first portion has a flat plate structure or a wedge-shaped plate structure.

7. The light guide plate as claimed in claim 1, wherein the light guide plate comprises two second portions respectively disposed at both ends of the first portion.

8. The light guide plate as claimed in claim 1, wherein the light input surface includes V-cut structures, S-shaped structures or a roughed surface structure.

9. The light guide plate as claimed in claim 1, wherein the first portion further includes a light reflection surface disposed on the opposite side of the light output surface.

10. The light guide plate as claimed in claim 1, wherein there is an angle between the first reflection surface and the second reflection surface, and the angle is less than 180 degrees.

11. A display apparatus comprising:
a light guide plate comprising:
a first portion including a light output surface and a light source disposing surface; and
at least one second portion formed on one end of the first portion, wherein the second portion includes a light input surface, a first reflection surface and a second reflection surface adjacent to the first reflection surface, and the first reflection surface is configured to reflect the light inputted from the light input surface to the second reflection surface, and the second reflection surface is configured to reflect the light reflected from the first reflection surface to the first portion, and the light input surface and the light output surface are substantially in the form of an L-shape, and the light source is disposed on an L-shaped area between the light input surface and the light output surface, and the light source contacts with the light source disposing surface, and the light source disposing surface and the light output surface are located at the same side of the light guide plate;
a display panel disposed on the light output surface of the first portion of the light guide plate, wherein there is a distance between the display panel and the second portion to form a receiving space; and
at least one light source disposed in the receiving space and adjacent to the light input surface of the second portion.

12. The display apparatus as claimed in claim 11, wherein the vertical height of the first reflection surface is equal to or greater than the vertical height of the light input surface.

13. The display apparatus as claimed in claim 11, wherein the first reflection surface or the second reflection surface is a plane surface.

14. The display apparatus as claimed in claim 11, wherein the first reflection surface or the second reflection surface is a curved surface.

15. The display apparatus as claimed in claim 11, wherein the first portion has a flat plate structure or a wedge-shaped plate structure.

16. The display apparatus as claimed in claim 11, wherein the light guide plate comprises two second portions respectively disposed at both ends of the first portion.

17. The display apparatus as claimed in claim 11, wherein the light input surface includes V-cut structures, S-shaped structures or a roughed surface structure.

18. The display apparatus as claimed in claim 11, wherein the first portion further includes a light reflection surface disposed on the opposite side of the light output surface.

19. The display apparatus as claimed in claim 11, wherein the light source is a cold cathode fluorescent lamp (CCFL), a hot cathode fluorescent lamp (HCFL), a light emitting diode (LED), an organic light emitting diode (OLED), an electroluminescence (EL) device, a light bar or any thereof.

20. The display apparatus as claimed in claim 11, further comprising:
a casing configured to dispose the light guide plate, wherein the casing includes a lamp cover disposed on the light source disposing surface forming a receiving space to receive the light source.

21. The display apparatus as claimed in claim 11, wherein the second portion is formed on one end of the first portion as one-piece.

* * * * *